United States Patent [19]

Mederer

[11] 3,730,460
[45] May 1, 1973

[54] JET-PROPELLED AIRCRAFT WITH MEANS FOR THRUST DEFLECTION

[75] Inventor: Andreas Mederer, Marktschwaben, Germany

[73] Assignee: Messerschmitt - Bolkow - Blohn GmbH, Munich, Germany

[22] Filed: Jan. 22, 1971

[21] Appl. No.: 108,809

[30] Foreign Application Priority Data

Feb. 13, 1970 Germany...................P 20 06 596.7

[52] U.S. Cl. ...............................................244/53 R
[51] Int. Cl. ................................................B64c 9/34
[58] Field of Search ....................244/42 DA, 87, 53, 244/90 R; 60/228, 230

[56] References Cited

UNITED STATES PATENTS 3,240,448 3/1966 Schaffer..................................244/87
3,312,429 4/1967 Hull..........................................244/53

*Primary Examiner*—Trygve M. Blix
*Attorney*—Woodhams, Blanchard & Flynn

[57] ABSTRACT

Jet aircraft having means for deflecting the thrust thereof for control purposes. Deflecting means are normally received into a suitable recess in structure adjacent the jet stream such as the horizontal stabilizer, the vertical stabilizer or the fuselage rearward of the jet output. Same are then actuated by any conventional means to extend the deflectors into the jet stream during slow speed operation of the aircraft and retracting same to permit during high speed operation of the aircraft all control functions to originate with the stabilizers, elevators and rudder. A further feature of the invention contemplates mounting the deflectors in a component movable with respect to the jet output, such as the elevators, with the elevators normally located below the jet output whereby the deflectors can be extended without entry into the jet stream at substantially level flight but will move gradually into the jet stream as said elevators are lifted during a landing operation.

7 Claims, 4 Drawing Figures

JET-PROPELLED AIRCRAFT WITH MEANS FOR THRUST DEFLECTION

The invention relates to a jet-propelled aircraft provided with means for effecting thrust deflection for control purposes.

This type of control assures an effectiveness independent of flying speed. It is of particular importance for V/STOL aircraft that they be completely under control during the critical takeoff or landing phase during which inflow velocities are either very low or completely absent.

It is already known to the prior art to deflect the jet efflux flowing from the tail of an aircraft by having the entire nozzle rotate either in any direction or in at least two planes. However, this design involves weight and cost penalties that are not in every case justified for all applications of this kind. For example, in most cases, it is sufficient if the means for thrust deflection is available for only the critical takeoff and landing phases, while at mission speeds the aerodynamically functioning control surface is preferred, especially due to its "natural" stabilization and damping properties. In addition, there is a desire to make the thrust deflection unit as simple and light as possible. It is therefore also known to the prior art, especially in the case of missiles, to effect deflection of the gas efflux by means of deflectors that project into the jet stream (Koelle, Theorie und Technik der Raumfahrzeuge, Stuttgart 1964, pages 387–388). However, this known device has the drawback that the deflection surfaces remain in the jet stream during the missile's entire propulsion phase and cause detrimental drag. In contrast to a missile, whose flight consists of a relatively brief power-on phase and a long free flight, the engines of an airplane operate as a rule during the entire flight, so that the proposal described above would not be without objectionable features when applied to aircraft.

It is the object of the present invention to provide a thrust deflection device for aircraft of the type mentioned above, which is light and uncomplicated and which can be operated by the pilot selectively during takeoff or landing, at high altitudes and low atmospheric pressures or in combat.

The invention solves this problem by having the deflection means consist of deflection surfaces that swing into the jet stream. These deflection surfaces can be actuated in a known manner with respect to the direction of jet flow so that this flow is deflected.

In one illustrative embodiment, especially in an aircraft with jet nozzles at the tail and an auxiliary control surface located approximately at the same station as the nozzle, it is provided that the deflection surfaces rotate about an axis which is approximately perpendicular to the horizontal tail and that they swing from a retracted, inoperative position located within the contour of the stabilizer into an operating position projecting into the gas stream. In this way the stowage problem for these deflection surfaces is solved advantageously as they add to the overall area of the stabilizer when in their inoperative position. A further advantage is that actuation of the deflection surfaces in a known way takes place simultaneously with actuation of the stabilizer, so that they require no separate control devices.

A further embodiment provides that the deflection surfaces be arranged on the trailing edge of the stabilizer and be accommodated in an appropriately sized recess therein so that they are flush with the stabilizer trailing edge when in the closed position. Thus, an especially effective and technically advantageous solution has been found which has no detrimental projections or vortex-producing corners on the stabilizer surface, which latter is itself designed in accordance with pure aerodynamic rules.

In another illustrative embodiment the stabilizer is located a certain distance below the jet nozzle axis so that when the stabilizer is in the neutral position, the deflection surfaces are, in their operative position, not in contact with the jet and when the stabilizer is fully deflected, they assume their position of maximum effectiveness in the gas stream. This solution allows the pilot to swing the deflection surfaces into their operative position at a time when they are not yet needed, so that he is relieved of this task during the ensuing critical flight phase. Also, sudden changes in control moments are prevented, as the deflection surfaces, upon operation of the stabilizer, move from a range outside the jet stream, penetrating continuously farther into the jet stream, until they reach their position of maximum effectiveness.

For an aircraft with two side-by-side nozzles in the tail and a tail cone which extends over the nozzles toward the rear, another illustrative embodiment provides that the control surfaces swing laterally into the gas stream and are controlled by control devices accommodated in the tail cone. These control devices can work independently of, or in conjunction with, the control devices for the aerodynamic control surfaces, if any.

The invention is employed essentially for pitch control in the foregoing description. Naturally, it can also be used for yaw control, in which case the deflection devices can be accommodated in the rudder.

Several illustrative embodiments are depicted in the drawings and are described in more detail hereinafter. Shown are:

Figure 1:
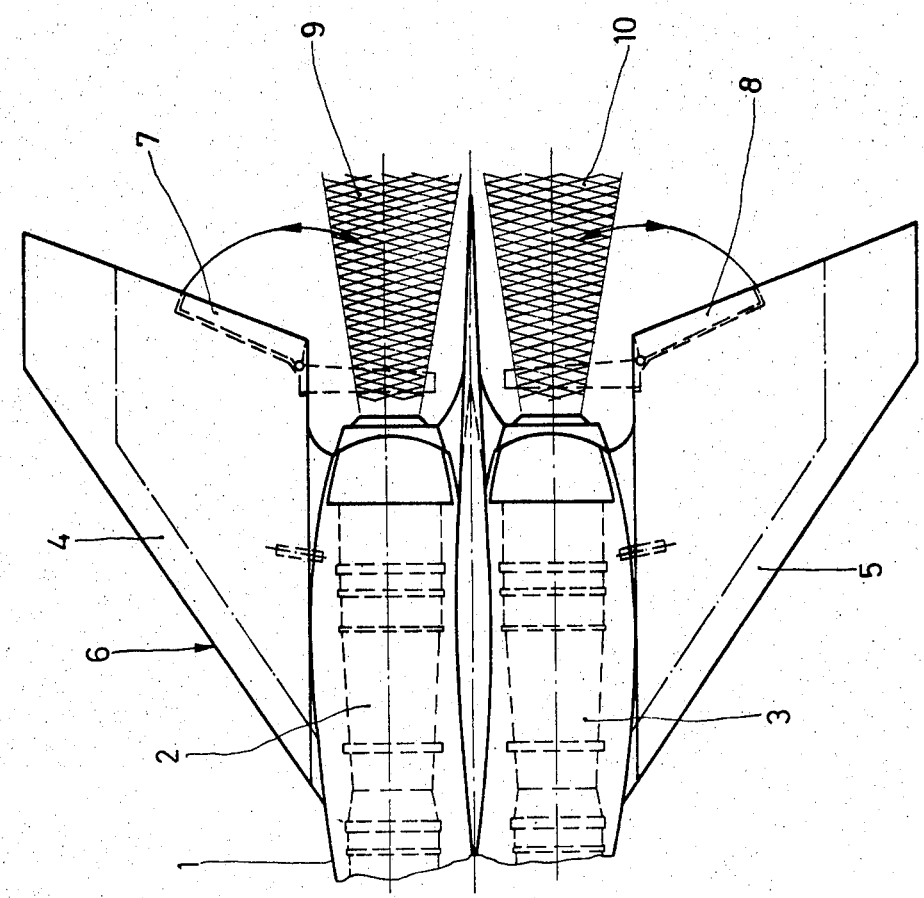
FIG. 1 is a plan view of the tail of a twin jet aircraft with a horizontal tail at approximately the same station as the nozzles.
Figure 2:
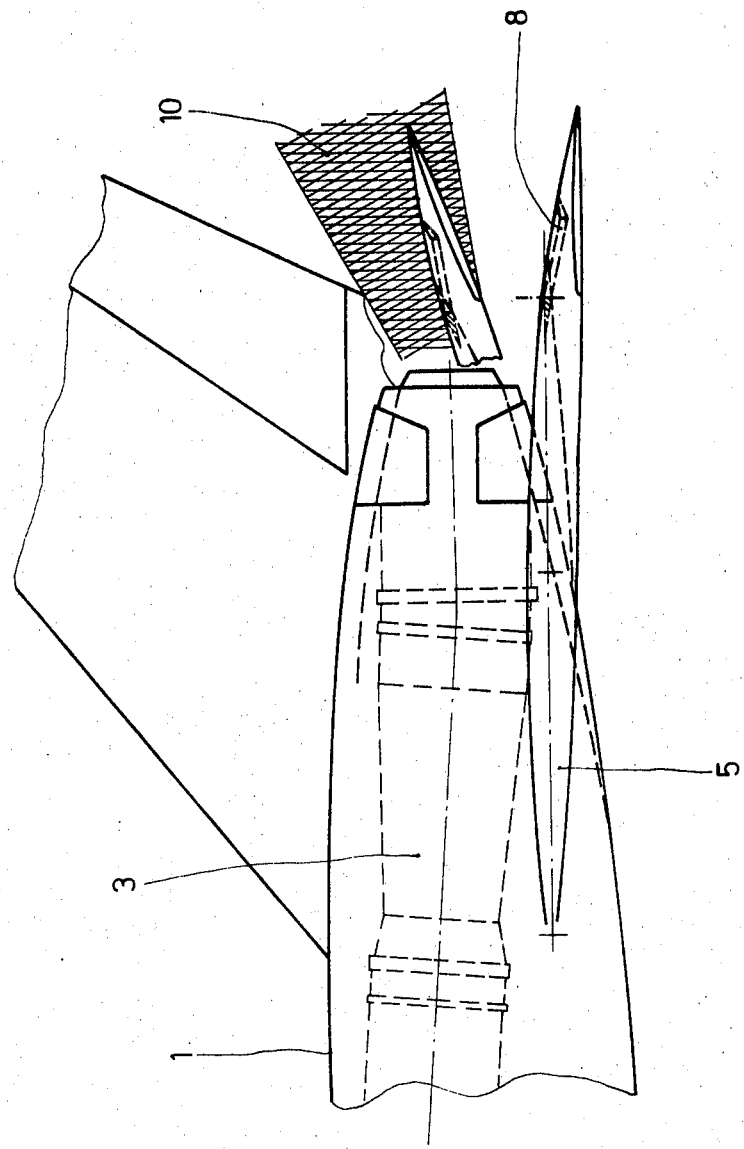
FIG. 2 is an aircraft tail according to FIG. 1, but seen from the side.

FIGS. 1 and 2 show a fuselage tail section 1 in which two engines 2, 3 are located side-by-side. At the sides of the fuselage are the two stabilizers of the horizontal tail 6. At the trailing edge of each stabilizer are the deflection surfaces 7, 8 which rotate about axes approximately perpendicular to the stabilizer surfaces. In their inoperative condition they are completely retracted into the contour of the stabilizers 4, 5, while in the operation position, they penetrate completely into the adjacent jet stream 9 or 10.

FIG. 2 shows that when the stabilizer 5 is at a certain angle above the neutral position, the deflection surface moves into the area of the exhaust gas 10. This feature permits the pilot to actuate the extension mechanism for the deflection surfaces prior to the anticipated critical landing phase, for example, as early as the landing approach, before the end phase. In addition, the action of the deflection surfaces does not commence suddenly, but increases continuously as the surfaces penetrate into the exhaust stream from below.

The dot and dash line in FIG. 1 denotes a reduced area with respect to that of horizontal tail 6 which is brought about by the fact that the action of the aerodynamic stabilizer is assisted by the effect of the thrust deflection. For this reason, it is no longer necessary to design the stabilizer surface for the "rotation," the sudden increase in angle of attack upon liftoff, but it is sufficient to have the smaller tail surface which suffices for highspeed flight. As is shown in FIG. 2, the deflection surface works in the same sense as the stabilizer, i.e., in the example shown, the aircraft tail is moved downwards so that a nose up moment is produced for the entire airplane.

Figure 3:
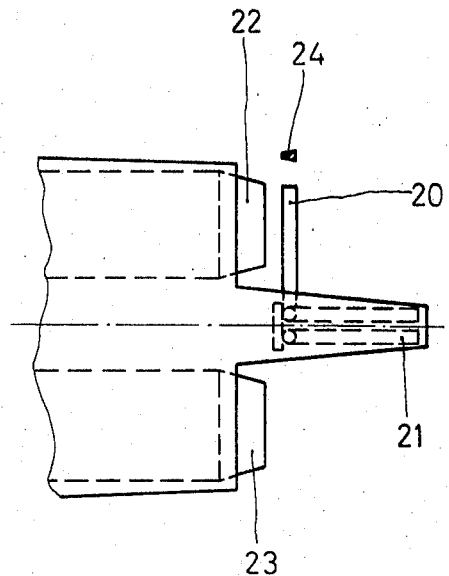
FIG. 3 is an aircraft tail with a tail cone extending toward the rear over the nozzles, shown in plan view.
Figure 4:
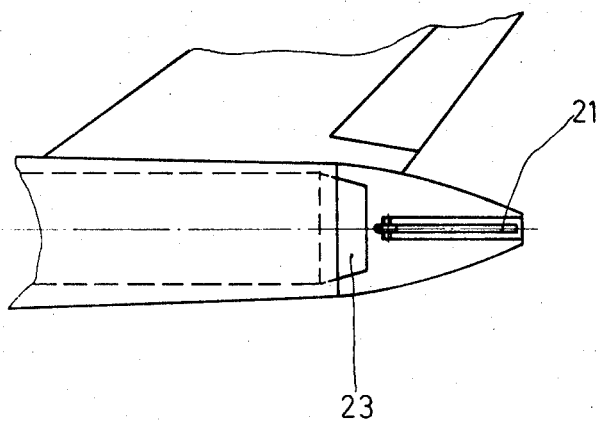
FIG. 4 is an aircraft tail according to FIG. 3, but seen from the side.

FIGS. 3 and 4 show a solution for the case in which the stabilizer is absent or in which it is in the form of a canard or stabilator. In this case, the deflection surfaces 20, 21 are accommodated in the tail cone 25 which extends rearward over the nozzles 22, 23 and are swung outwards from the sides into the adjacent jet stream.

The profile of the deflection surfaces is preferably a supersonic profile of the known type, for example, a wedge profile 24 or a double wedge profile, not shown.

The embodiments of the invention in which an exclusive property or privilege is claimed are defined as follows:

1. In an airplane having a vertical tail surface and a horizontal tail surface and means for supporting a jet engine adjacent said horizontal tail surface, said jet engine producing a gaseous stream for propelling said airplane, the combination comprising:
   deflection means for deflecting said gaseous stream, said deflection means including surface means and support means for supporting said surface means for pivotal movement between first and second positions about an axis which is substantially perpendicular to said horizontal tail surface; and
   storage means on said horizontal tail surface for storing said surface means in said first position, said surface means being pivotable about said support means to said second position wherein said surface means is adapted to contact and deflect said gaseous stream.

2. The combination according to claim 1, wherein said surface means has an outer contour conforming to the outer contour of said horizontal tail surface when in said first position.

3. The combination according to claim 2, wherein said surface means is located on the trailing edge of said horizontal tail surface and wherein said storage means comprises a recess of appropriate size in said horizontal tail so that said surface means is flush with said trailing edge.

4. The combination according to claim 3, wherein said horizontal tail surface is located below the axis of said gaseous stream so that when said horizontal tail surface is in a neutral position and said surface means is swung into said first position, said surface means is free of contact with said gaseous stream and when said horizontal tail surface is at said second position, said surface means is in the position of greatest deflection effectiveness or said gaseous stream.

5. The combination according to claim 4, wherein said airplane has a pair of thrust nozzles side-by-side and wherein said horizontal tail surface has a pair of surface components, said storage means storing one of said surface means on each of said surface components of said horizontal tail surface, each of said surface means being pivotal about an axis substantially perpendicular to said horizontal tail surface.

6. In an airplane having at least a vertical tail and means for supporting a jet engine, said jet engine producing a gaseous stream at an outlet nozzle for propelling said airplane, the combination comprising:
   surface means positioned adjacent said outlet nozzle;
   support means for supporting said surface means for pivotal movement between a first position of use and a second stored position about a substantially vertical axis parallel to said vertical tail and which is substantially perpendicular to said surface means, said surface means being adapted to contact said gaseous stream to deflect same when in said first position of use and stored in a position of nonuse when in said second position.

7. Aircraft according to claim 6, wherein said airplane has a pair of jet nozzles side-by-side on opposite sides of a tail cone that extends rearwardly of said nozzles and wherein said surface means each is swingable out of the tail cone sideways into said gaseous stream.

* * * * *